(12) United States Patent
Paasio

(10) Patent No.: US 7,349,939 B2
(45) Date of Patent: Mar. 25, 2008

(54) PROCESSOR, A CIRCUIT AND A METHOD FOR PROCESSING IMAGES IN A PARALLEL PROCESSOR NETWORK

(76) Inventor: Ari Paasio, Hollanterinpolku 4, FIN 20660 Littoinen (FI)

( * ) Notice: Subject to any disclaimer, the term of this patent is extended or adjusted under 35 U.S.C. 154(b) by 636 days.

(21) Appl. No.: 10/451,152

(22) PCT Filed: Dec. 28, 2001

(86) PCT No.: PCT/FI01/01154

§ 371 (c)(1),
(2), (4) Date: Nov. 7, 2003

(87) PCT Pub. No.: WO02/054348

PCT Pub. Date: Jul. 11, 2002

(65) Prior Publication Data

US 2004/0073594 A1     Apr. 15, 2004

(30) Foreign Application Priority Data

Dec. 28, 2000 (FI) .................................. 20002864

(51) Int. Cl.
*G06G 7/00* (2006.01)
(52) U.S. Cl. .................................................. 708/800
(58) Field of Classification Search .................. 708/800
See application file for complete search history.

(56) References Cited

U.S. PATENT DOCUMENTS

| | | | |
|---|---|---|---|
| 4,692,892 A | 9/1987 | Anizan et al. | |
| 5,517,134 A * | 5/1996 | Yaklin | 327/65 |
| 6,011,295 A | 1/2000 | Merrill et al. | |
| 6,167,418 A | 12/2000 | Suzuki | |
| 6,281,730 B1 * | 8/2001 | Vu | 327/170 |
| 6,448,851 B1 * | 9/2002 | McIntosh et al. | 330/207 A |
| 7,034,583 B1 * | 4/2006 | Maclean et al. | 327/112 |

FOREIGN PATENT DOCUMENTS

DE     19741209     1/1999

(Continued)

OTHER PUBLICATIONS

Chua et al., "Cellular Neural Networks: Theory", IEEE Transactions on Circuits and Systems, vol. 35, No. 10, Oct. 1988.

(Continued)

*Primary Examiner*—Tan V. Mai
(74) *Attorney, Agent, or Firm*—Arent Fox LLP

(57) ABSTRACT

A processor, a circuit and a method for processing images in an analog parallel processor network. A processor comprises a plurality of circuits, a bias transistor and an output transistor. A circuit comprises a first transistor and a second transistor, which receive respective supply voltages and operate as current sources, providing an output voltage. A circuit further comprises a coefficient coupling, which receives the output voltage provided by the first transistor and the second transistor, providing a switching function for a circuit output current. A transistor in a coefficient coupling determines a mode of operation based on the output voltage, provided by the first transistor and the second transistor, and an input current. The circuit provides an output current of the circuit for further processing.

19 Claims, 4 Drawing Sheets

FOREIGN PATENT DOCUMENTS

EP        0 438 800 A    7/1991

OTHER PUBLICATIONS

Yin et al., "Circuits and Systems Exposition Weighted Median Filters: A Tutorial", IEEE Transactions on Circuits and Systems—II: Analog and Digital Signal Processing, vol. 43, No. 3, Mar. 1996.

Patent Abstract of Japan vol. 1997, No. 03, Mar. 31, 1997 & JP 08 298663 A (Canon Inc.), Nov. 12, 1996.

Patent Abstract of Japan vol. 2000, No. 02, Feb. 29, 2000 & JP 11 304455 A (TOA Doro Kogyo Co LTD; ENG KK), Nov. 5, 1999.

\* cited by examiner

PROCESSOR, A CIRCUIT AND A METHOD FOR PROCESSING IMAGES IN A PARALLEL PROCESSOR NETWORK

TECHNICAL FIELD OF THE INVENTION

The present invention relates to a processor, a circuit and a method for processing images in a parallel processor network, and more particularly for processing images in an analog parallel processor network.

BACKGROUND OF THE INVENTION

A parallel processor network includes several identical processors (cells) that are arranged in a regular form. Each cell has an income signal, a dynamic state and an outcome signal.

The idea in a parallel processor network for processing images is that one processor (cell) corresponds to one pixel, and therefore, it is possible to provide a parallel processor network that is able for very fast processing (in theory). A problem for integrating this kind of a parallel processor network into a chip is that the size of processors have not been minimized to enable implementing integration of tens or hundreds of thousands of processors into a chip without lowering the liability.

In a parallel processor network, the cells are connected to their neighboring cells (they can also be connected for example to all other cells in a parallel processor network), i.e., they affect to a dynamic state of their neighboring cells. This affect correlates straightforwardly to the income of the cell and its own dynamic outcome. These features enable a real-time signal processing, because the data processing occurs in all cells at the same time.

A parallel processor network can be implemented for processing images, e.g. for filtering salt & pepper noise from an image. There has been presented several methods for filtering noise from image, wherefrom one of the generally used methods is median filters. A median filter is a special case of a ranked-order filter in which a median of the numbers can be chosen, but also any other ranked-order number unit can be chosen. These cases include for example finding a maximum or a minimum from a specified array of numbers. The operations, which use a method based on finding a maximum or a minimum from the specified array of numbers, are widely used in image processing, e.g., when mathematical morphology operations are implemented.

One special case of ranked order filtering is median filtering e.g., the fifth largest current out of nine currents is extracted. An extension to the basic median filtering is described e.g., in L. Yin, R. Yang, M. Gabbouj and Y. Neuvo, "Weighted Median Filters: A Tutorial", IEEE Transaction on Circuits and Systems—II, Vol. 43, pages 157-192, 1996, where each input can be given different weights to favor the selection of certain variables. In this weighting scheme a weight of a magnitude e.g., three assigned to a certain variable means practically that the variable is entered three times to the list of variables out of which the median is selected. This also means that the total number of variables out of which the selection is to be made has increased by two.

There has been described some analog implementations for filtering images. In an article by G. Fikos, S. Vlassis, and S. Siskos, "High-Speed, Accurate Analogue CMOS Rank Filter", Electronics Letters, Vol. 36, No. 7, pages 593-594, 2000, there is proposed a current-mode rank extractor in which a circuit is suitable for multiple inputs. Furthermore, the extracted rank is selectable, i.e., the rank filtering involves the selection of the kth largest current I(k). A basic cell of the implementation is a current comparator, which has an output current. The basic cell contains two different building blocks, one to perform the actual comparison and one to provide the current output. The current output of the basic cell is realized by complementary current sources, i.e., one source provides positive output currents and the other provides negative output currents, with switches at their outputs. The magnitudes of the output currents of these current sources are assumed to have equal magnitudes inside one basic cell, and also within the whole system. Thus the system is not able to perform weighted ranked order filtering. The output switches are controlled by a voltage that is generated inside the basic cell by a current comparator with voltage output. A plurality of basic cells provide their current output to a common node where the sum of the output currents is compared to another current. This another current is generated by a current source that must be able to provide both positive or negative currents, one polarity at the time, and by controlling the magnitude and sign of this particular current source input currents to the system that have a predetermined ranked order can be extracted.

The analog implementations for processing images described in prior art do not allow programmable function or they are too complex to be integrated into a chip in large numbers of processors. Some of the structures described in prior art also have essentially high power consumption, and therefore, it is not preferred to integrate thousands of processors into a chip.

SUMMARY OF THE PRESENT INVENTION

It is an object of the present invention to overcome or at least mitigate the disadvantages of the prior art. The present invention provides a processor, a circuit and a method that enable smaller processors in an analog parallel processor network.

According to a first aspect of the present invention there is provided a processor in an analog parallel processor network, for image processing, the processor comprising:

a plurality of circuits, wherein a circuit comprises a first transistor and a second transistor, which receive respective supply voltages and operate as current sources, providing an output voltage, and a coefficient coupling, which receives the output voltage provided by the first transistor and the second transistor, providing a switching function for a circuit output current;

a bias transistor; and an output transistor.

Preferably, the bias transistor provides an output current that is set to a value in which a current with a specific ranked order number from the set of output currents of the first transistor, or respective transistors, can be determined.

Preferably, the output transistor provides an output current from the processor.

Preferably, the coefficient coupling comprises: a third transistor, which operates as a current source and a fourth transistor, which provides a switching function. More preferably, the coefficient coupling provides three modes of operation: the fourth transistor conducts the current, the fourth transistor conducts a limited amount of the current, or the fourth transistor does not conduct the current.

Preferably, the third transistor receives a coefficient voltage that is programmable.

Preferably, the output voltage provided by the first transistor and the second transistor is the control voltage of the fourth transistor.

Preferably, the first transistor has an inlet for the supply voltage and an inlet for a control voltage.

Preferably, the second transistor has an inlet for the supply voltage and an inlet for a control voltage, wherein the control voltage is formed from an output current of the fourth transistor together with other output currents received from respective transistors of a processor and from the bias transistor.

Preferably, at least one of the transistors is a PMOS transistor.

Preferably, at least one of the transistors is a NMOS transistor.

Preferably, the processor further comprising at least one transistor for providing an output current that is summed up with the first transistor.

According to a second aspect of the present invention there is provided a circuit for processing images in an analog parallel processor network, the circuit comprising:

a first transistor and a second transistor, which receive respective supply voltages and operate as current sources, providing an output voltage; and a coefficient coupling, which receives the output voltage provided by the first transistor and the second transistor, providing a switching function for a circuit output current.

According to a third aspect of the present invention there is provided a method for processing images in an analog parallel processor network, the method comprising:

receiving a source voltage and a control voltage in a first transistor, and forming an output current of the first transistor;

receiving a source voltage and a control voltage in a second transistor, and forming an output current of the second transistor;

receiving a source voltage and a coefficient voltage in a third transistor, and providing an input current to a fourth transistor;

receiving an input voltage, which is defined with respect to the output currents of the first transistor and the second transistor, and an input current from the third transistor in the fourth transistor;

determining a mode of operation in the fourth transistor based on the input voltage and the input current; and providing an output current of the fourth transistor for further processing.

Preferably, the coefficient voltage is programmable.

Preferably, the mode of operation is one of the following:

the fourth transistor conducts the input current;

the fourth transistor conducts a limited amount of the input current; or the fourth transistor does not conduct the input current.

Preferably, the output current of the fourth transistor is provided to form a control voltage of the second transistor, and other respective transistors in a processor, together with other output currents received from respective transistors and from a bias transistor of the processor in an analog parallel processor network.

Preferably, the method further comprising a bias transistor providing an output current that is set to a value in which a current with a specific ranked order number from the set of output currents of the first transistor, or respective transistors, can be determined.

According to a fourth aspect of the present invention there is provided a processor for processing images in an analog parallel processor network, the processor comprising:

a plurality of circuits, wherein a circuit comprises a first transistor and a second transistor, which receive respective supply voltages and operate as current sources, providing an output voltage and a third transistor, which receives a source voltage and the output voltage provided by the first transistor and the second transistor, providing a switching function for a circuit output current;

a bias transistor, which provides an output current that is set to a value in which a current with a specific ranked order number from the set of the first transistor, or respective transistors, can be determined; and an output transistor for providing an output current of the processor to following process.

According to a fifth aspect of the present invention there is provided a method for processing images in an analog parallel processor network, the method comprising:

receiving a source voltage and a control voltage in a first transistor, and forming an output current of the first transistor;

receiving a source voltage and a control voltage in a second transistor, and forming an output current of the second transistor;

receiving an input voltage, which is defined with respect to the output currents of the first transistor and the second transistor, and a source voltage in a third transistor;

determining a mode of operation in the third transistor based on the source voltage and the input voltage;

providing an output current of the third transistor for further processing;

forming a control voltage of the second transistor from the output currents of at least one third transistor and a bias transistor of a processor, wherein the output current of the bias transistor is set to a value in which a current with a specific ranked order number from a set of output currents of the first transistors can be determined; and conducting the control voltage to at least one second transistor in the processor.

The present invention provides a simple analogue implementation, which can be programmed according to a ranked order number or to a weighted coefficient. The present invention further achieves lower power consumption than the prior art implementations. The present invention is also easy to implement to an existing system, because the present invention implements the transistors that already exist in processor units for processing images.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

The present invention is designed for implementation in an analog parallel processor network, although it may also be implemented such that only one circuit is implemented to a system. The present invention may be implemented to process and/or analyze images, and achieves a high-speed calculation (over $10^{12}$ calculations per second) in one chip.

Figure 1:
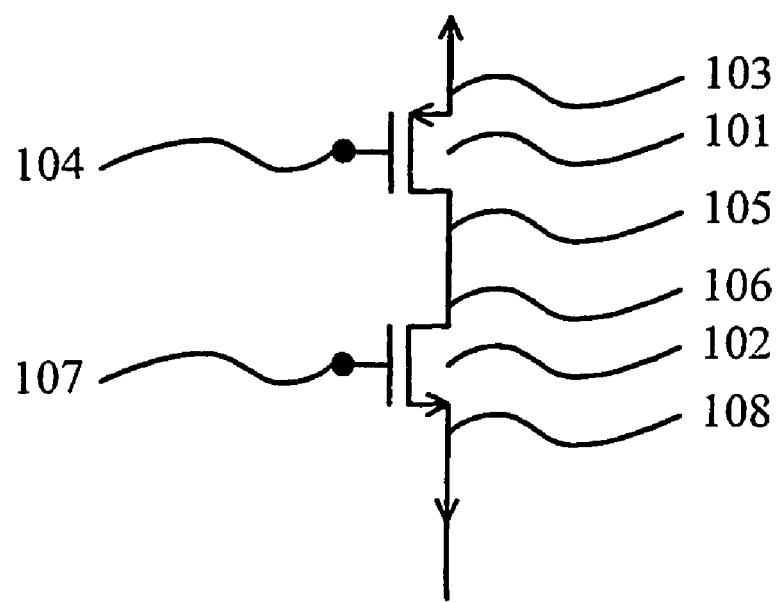
FIG. 1 shows a coefficient coupling that is implemented in the preferred embodiment of the present invention.

FIG. 1 shows a coefficient coupling that is implemented in the preferred embodiment of the present invention. In this exemplary illustration, the coefficient coupling has two transistors 101, 102. The first transistor 101 has an inlet 103 for a source voltage, and an inlet 104 for a coefficient voltage. Furthermore, the first transistor 101 has an outlet 105 for providing a current to the second transistor 102, i.e., the first transistor 101 is a current source of the second transistor 102. The coefficient voltage used in the present invention is programmable. The coefficient voltage may be programmed e.g., according to weight values predetermined by weighted ranked order filtering algorithms.

The second transistor 102 has an inlet 106 for the current conducted from the first transistor 101 and an inlet 107 for a control voltage. The second transistor 102 also has an outlet 108 for an output current. The second transistor 102 operates as a switch in a coefficient coupling, determining modes of operation.

In the present invention, there are three modes of operation for a coefficient coupling circuit. The first mode of operation is when the switch conducts the whole current without restricting the amount of the current provided by a current source. In a first mode of operation the control voltage of the second transistor is high enough that the restriction of the current does not occur. Usually this voltage is in close proximity to the positive supply voltage. In such case, the coefficient voltage of the first transistor defines the output current. In a second mode of operation, a switch conducts some amount of current but restricts the amount of the current provided by the current source. When the second mode of operation occurs, the output current of the coupling is between the current value provided by the current source in an unlimited case and 0. In a third mode of operation, the switch does not conduct the current at all. In the third mode of operation, the switch does not conduct the current, because the control voltage is in low level, and therefore, the output current of the coefficient coupling is 0. In this exemplifying presentation, the current source is a PMOS-transistor and the switch is a NMOS-transistor. Another possibility is to form a coefficient coupling, wherein a current source is a NMOS-transistor and a switch is a PMOS-transistor. In this case, the polarities of the voltages are opposite, i.e., a high voltage in the above description will be a low voltage in this case and contrary.

Figure 2:
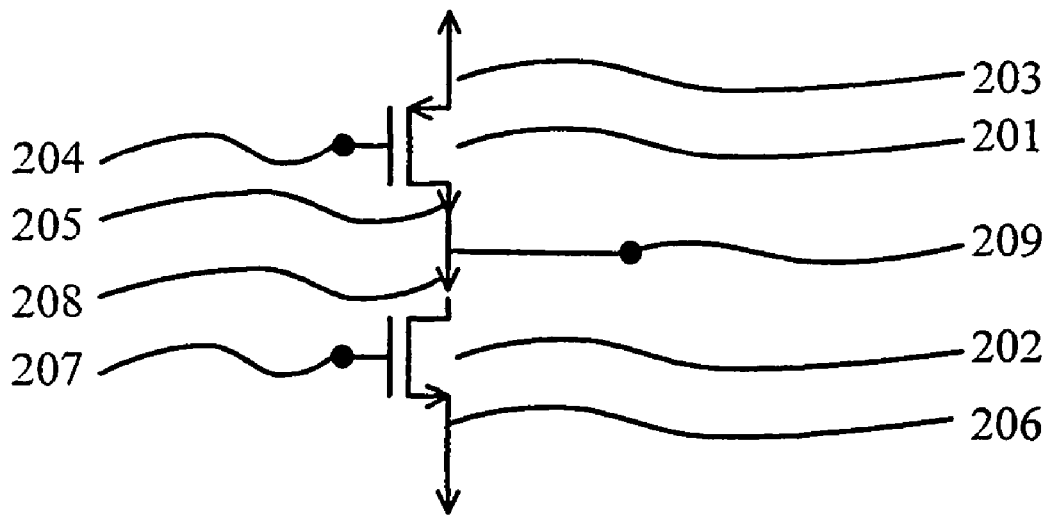
FIG. 2 shows a structure, having two current sources, and a result output voltage, according to a preferred embodiment of the present invention.

FIG. 2 shows a structure having two current sources, i.e., transistors 201 and 202. The first transistor 201 has an inlet 203 for a source voltage, and an inlet 204 for a control voltage. Furthermore, the first transistor 201 has an outlet 205 for providing a current to the second transistor 202. The second transistor 202 has an inlet 206 for a source voltage, and an inlet 207 for a control voltage. The second transistor 202 further has an outlet 208 for an output current. FIG. 2 also shows an output voltage that is a result voltage occurred from the relative current value difference between the current received from the first transistor 201 and the current received from the second transistor 202.

In the structure according to FIG. 2, the first transistor 201 tends to feed an output current through the second transistor 202. The value of the current provided by the first transistor 201 is dependent on the control voltage of the first transistor 201. The second transistor 202 is able to let through a current, which is defined by the control voltage of the second transistor 202.

Depending on the relative values of the unrestricted output currents of the first transistor 201 and the second transistor 202, the result output voltage is in close approximate whether to a source voltage received in the first transistor 201 or to a source voltage received in the second transistor 202, the result value may also be in between these values. In case the unrestricted output current of the first transistor tends to be larger than the unrestricted output current of the second transistor, the result output value is in close approximate to the source voltage of the first transistor. In case the unrestricted output current of the second transistor tends to be larger than the unrestricted output current of the first transistor, the result output voltage value is in close approximate to the source voltage of the second transistor. In case the unrestricted output currents are essentially equal, the result output voltage is between the values of the source voltages of the first transistor and the second transistor.

Figure 3:
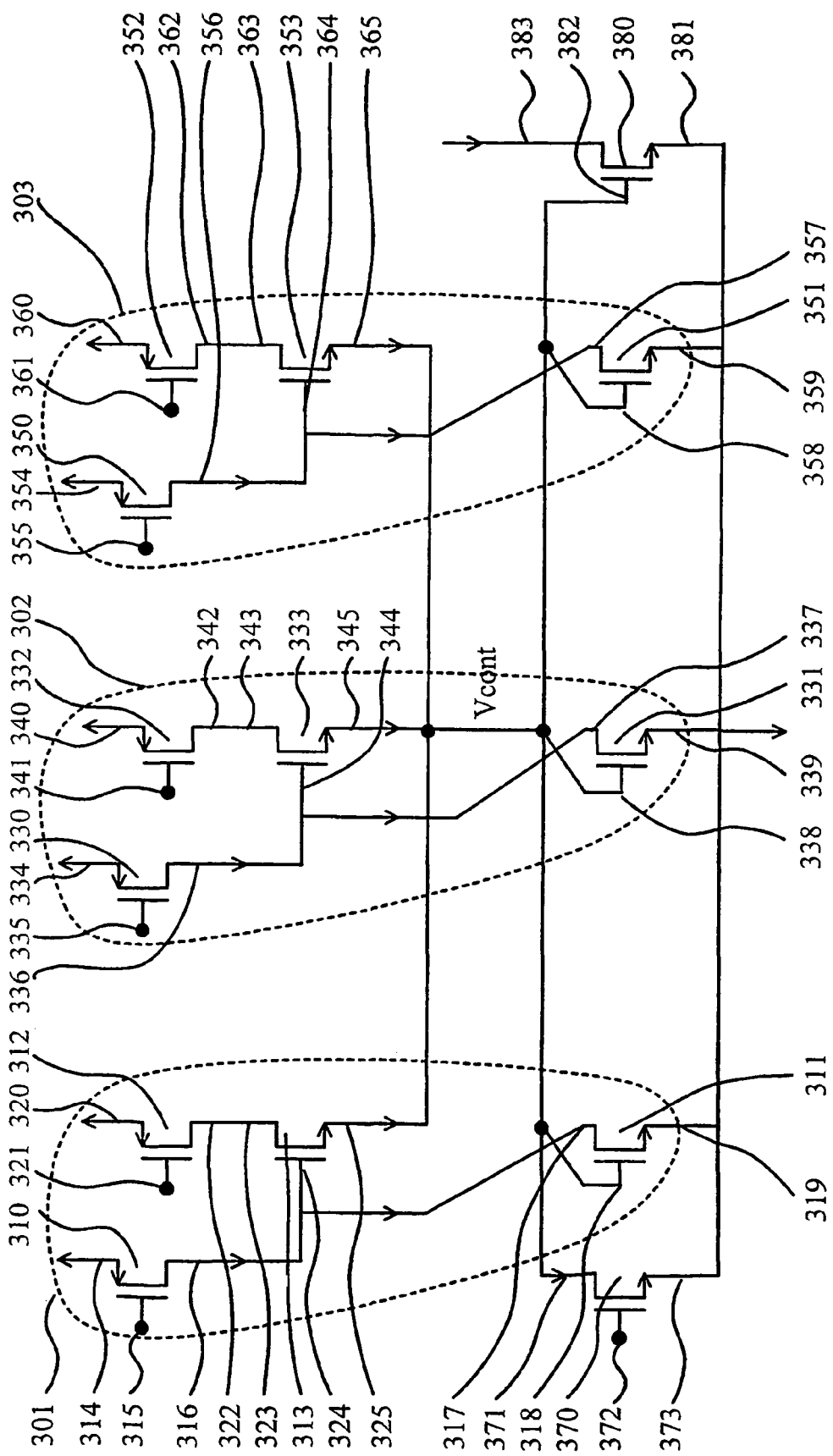
FIG. 3 shows an inventive concept of the present invention.

FIG. 3 shows an inventive concept of the present invention. FIG. 3 shows three circuits 301, 302 and 303, each of which comprises four transistors, a bias transistor 370 and an output transistor 380. Circuit 301 comprises four transistors 310, 311, 312 and 313, from which the transistors 310 and 311 forms a structure disclosed with reference to a FIG. 2, and transistors 312 and 313 forms a coefficient coupling disclosed with reference to FIG. 1. The transistor 310 functions as the first transistor 201 in FIG. 2, having similar inlets and an outlet, i.e., an inlet 314 for a source voltage, an inlet 315 for a control voltage, and an outlet 316 for providing a current to a following transistor 311. The transistor 311 functions as the second transistor 202 in FIG. 2, having similar inlets and an outlet, i.e., an inlet 317 for a source voltage, an inlet 318 for a control voltage, and an outlet 319 for providing an output current. Transistors 312 and 313 form a coefficient coupling, which corresponds to the coefficient coupling disclosed with reference to FIG. 1, having similar inlets (320, 321, 323 and 324) and outlets (322 and 325). The coefficient coupling (i.e., transistors 312 and 313) functions the same way as the coefficient coupling in FIG. 1. Circuit 302 (circuit 303) comprises the transistors 330-333 (350-353), having inlets and outlets 334-345 (354-365), which correspond to the transistors 310-313 and the inlets and outlets 314-319 of the circuit 301. A bias transistor 370 has an inlet 371 for a source voltage, an inlet 372 for a control voltage and an outlet 373 for providing an output current of the bias transistor 370. An output transistor 380, in turn, has an inlet 381 for a source voltage, an inlet 382 for a control voltage and an outlet 383 for providing an output current of the system. The output current of the output transistor 380 may be conducted e.g., to another processor in a parallel processor network or to a memory unit.

The apparatus of FIG. 3 is capable to evaluate the first, second and third biggest of the output currents of the transistors 310, 330 and 350. A skilled person in the art appreciates that even though there is only three circuits presented in this presentation, the number of circuits, and therefore also the number of the output currents of the first transistors, may be different (e.g., four or more), and the same evaluation procedure still applies to the system.

It may be a situation that there is a need to add some non-negative current into every input current of the system, when implementing mathematical morphology. In this situation, there is one or more transistors similar to the first transistor in every circuit, wherein an output current of the added transistor(s) is (are) summed up with the output current of the first transistor to form a sum output current of these transistors, which will be evaluated in a same way as the output current of the first transistor in the following simplified presentation of the process applied in the present invention. The added transistor(s) is (are) similar to the first transistor, i.e., in case the first transistor is a PMOS transistor the added transistor(s) is (are) also a PMOS transistor(s). If the first transistor type is a NMOS transistor, the added transistor(s) is (are) also a NMOS transistor(s)

In this exemplifying presentation, the transistors 380, 311, 331 and 351 are of the same size, and because they have the same control voltage (Vcont) and the same supply voltages, it can be understood that unrestricted output currents of the transistors 380, 311, 331 and 351 are of the same value.

As for exemplifying purposes, the output current of the transistor 310 is greater than the output current of the transistor 330, which in turn is greater than the output current of the transistor 350. The transistors 311, 331 and 351, which are for example NMOS transistors, provide equal output currents in an unrestricted case. Further, the control voltages of the transistors 312, 332 and 352 are of the same value, and the sizes of the transistors 312, 332 and 352 are the same. Even though, the control voltages and the sizes of the transistors 312, 332 and 352 are of the same in this exemplifying presentation, they are of the same size for simplifying the presentation. The control voltages and the sizes of the transistors 312, 332 and 352 can differ for example so that the output currents of the transistors 312, 332 and 352 are defined in relation to a weighted coefficient, e.g., the output current of the transistor 332 is three times as big as the values of the output currents of the transistors 312 and 352. The unrestricted output current of the transistors 312, 332 and 352 is called a reference current (Iref). In a stable equilibrium some of the output currents of transistors 312, 332 and 352 may not be restricted by the accompanying switch transistors 313, 333 and 353, respectively, some of the output currents may be restricted by the switches and some output currents may be 0 corresponding to the three modes of operation described with reference to FIG. 1. The equilibrium conditions are controlled by a bias current, the output current of the bias transistor 370, in such a way that the sum of the output currents through switches 313, 333 and 353 equals the output current of the bias transistor 370.

First, the biggest value of the output currents of the transistors 310, 330, and 350 will be examined. The output current value of the bias transistor 370 is chosen to be between the reference current value and 0 (with a restriction that the value should not be exactly 0). The value of the output current of the bias transistor 370 can be, for example, half of the value of the reference current. Then the equilibrium of the system is as follows. The voltage (Vcont), which is also a control voltage of the transistors 311, 331, and 351, will be such a value that the output current value of the transistor 311 will be equal to the output current value of the transistor 310. In this situation, the transistor 313 will conduct part of the output current of the transistor 312, and the value of the output current of the transistor 313 equals to the output current value of the bias transistor 370. Because the value of the output current of the transistor 331 is greater than the value of the output current of the transistor 330, the potential value of the control voltage of the transistor 333 will get so low that the transistor 333 does not conduct the output current of the transistor 332, i.e., the value of the output current of the transistor 333 equals to 0. In this situation, the same may be applied to the circuit 303, i.e., the value of the output current of the transistor 353 will equal to 0. Because the control voltage of the output transistor 380 is also Vcont, the value of the output current of the output transistor 380 will equal to the values of the output currents of the transistors 310 and 311 (which are equal), i.e., the output current of the output transistor 380 equals to the biggest value of the output currents of the transistors.

Now we will present how the second biggest output current value of the transistors 310, 330, and 350 will be evaluated. For achieving this result, the input current value of the bias transistor 370 will be chosen to be between the values of the reference current (Iref) and the reference current multiplied by two (2*Iref), e.g., the value of the input current of the bias transistor 370 is reference current multiplied by 1.5 (1.5*Iref). In such a situation, the equilibrium of the system is following. The control voltage of the transistors 313, 333, and 353 will be such a value, in which the values of the output currents of the transistors 330 and 331 will be equal. In this situation, the value of the output current of the transistor 310 is bigger than the value of the output current of the transistor 311, and therefore, control voltage of the transistor 313 will grow until the transistor 313 conducts the output current of the transistor 312. The output current value of the transistor 333 equals to the value where the output current value of the bias transistor 370 is deducted by the output current value of the transistor 310, which in this case equals to the reference current (Iref). Because the value of the output current of the transistor 351 is greater than the value of the output current of the transistor 350, the potential value of the control voltage of the transistor 353 will get so low that the transistor 353 does not conduct the output current of the transistor 352, i.e., the value of the output current of the transistor 353 equals to 0. In the equilibrium of the system, the output current value of the transistor 331 equals to the output current value of the transistor 330, and because the control voltages of the transistor 331 and the output transistor 380 are equal, also the output current of the system equals the output current of the transistor 330.

If the third biggest value of the output currents of the transistors 310, 330 and 350 will be evaluated, the following process can be applied. It is known that the third biggest output current value is also the smallest output current value, which in this example is the output current value of the transistor 350. In this example, we will set the bias current between 2*Iref and 3*Iref, for example bias current equals to 2.5*Iref. In such a situation, the equilibrium of the system is when the switches 313 and 333 conduct the respective currents and switch 353 conducts a limited amount of the current received from the transistor 352. In this case the output current of the output transistor 380 equals to output current of the transistor 351, which also equals to the output current of the transistor 350.

Even though in the above embodiment, the biggest output current value were analyzed, where after the second biggest output current value were analyzed, it is not necessary to analyze the output current values in this specific order. The present invention enables to find any output current value. In general, it is possible to find any ordered output current value, when the bias current value is set between $(N-1)*Iref$ and $N*Iref$, wherein N equals to the ranked order number that is wanted to be found and Iref is the reference value described in the previous paragraphs. In the present invention, it is possible to use the following formula for a bias current to select the ranked order (e.g., the sixth biggest) input current:

$$(((N-1)+N)/2)*\text{Iref}$$

When analyzing with the above formula, which transistor has the sixth biggest output current value, N equals to 6 and the bias current value therefore equals to 5.5*Iref.

When implementing an analog parallel processor network according to the present invention, the analog parallel processor network comprises a plurality of processors. The analog parallel processor network further comprises a plurality of memory units. The output current of the output transistor 380 is provided to a memory unit in an analog parallel processor network, where from the memory unit can provide a voltage to the inlets 315 (335 and 355 respectively) of the transistors 310 (330 and 350 respectively) of another processor.

In an alternative embodiment of the present invention, the coefficient coupling, shown in FIG. 3, is replaced with a different kind of coupling. In this embodiment of the present invention the coupling comprises only one transistor. The object of the alternative embodiment of the present invention is to minimize the space required for one processor in the chip. As for achieving this result, the programmable function of the coefficient coupling has to be compromised.

In this alternative embodiment of the present invention, the transistors 312, 332 and 352 are deleted from the circuits 301, 302 and 303. Each one of the transistors 313, 333 and 353 receives a source voltage and provides an output current to further processing according to the switching function of the transistors 313, 333 and 353. The source voltage is preferably set low enough in order to keep the unity current (i.e., Iref) practically low.

Except for the simplified structure of the coupling (and elimination of the coefficient structure of the coupling) that provides switching function of the circuit, the process of the structure remains essentially similar to the preferred embodiment of the present invention that is described with respect to FIG. 3.

Figure 4:
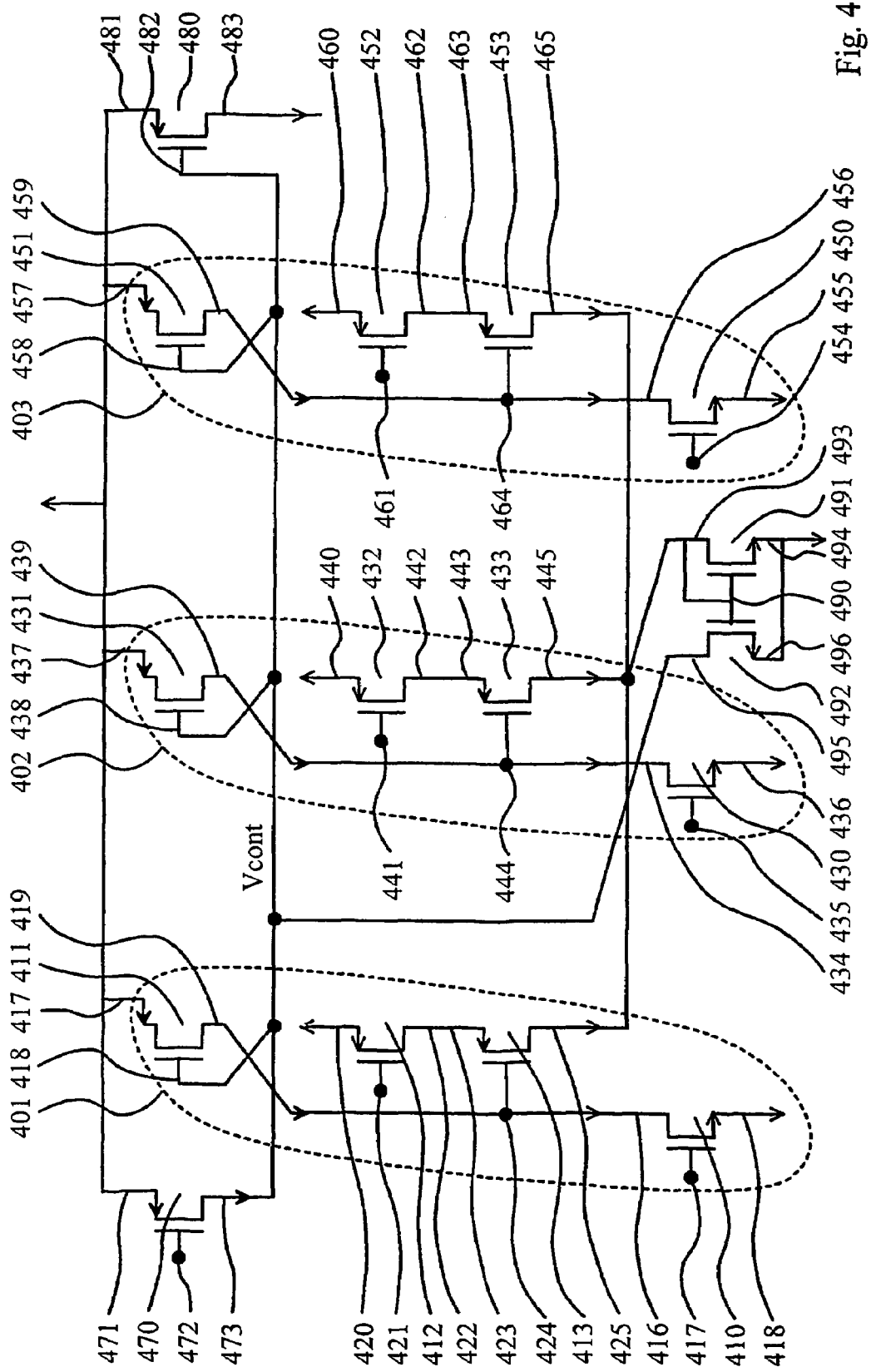
FIG. 4 shows an alternative embodiment of the inventive concept of the present invention.

FIG. 4 shows an alternative embodiment of the inventive concept of the present invention. FIG. 4 shows three circuits 401, 402 and 403, each of which comprises four transistors, a bias transistor 470 and an output transistor 480. Circuit 401 comprises four transistors 410, 411, 412 and 413. The transistor 410 has an inlet 414 for a source voltage, an inlet 415 for a control voltage, and an outlet 416 for providing an output current of the transistor 410. The transistor 411 has an inlet 417 for a source voltage, an inlet 418 for a control voltage, and an outlet 419 for providing an output current. Transistors 412 and 413 form a coefficient coupling having inlets 420, 421, 423 and 424 and outlets 422 and 425. The coefficient coupling (i.e., transistors 412 and 413) functions the same way as the coefficient coupling in FIG. 3 except the transistors 412 and 413 are of the same type, e.g., PMOS transistors. This change of the type of the switching transistor 413 also changes the logic when the switch 413 does or does not conduct to the opposite. This change of modes of operation also requires the use of the current mirror 490 to negate the combined current received from the transistors 413, 433 and 453. The current mirror 490 has two transistors 491 and 492, which in turn have inlets 493 and 495 and outlets 493 and 496. Furthermore, the bias transistor 470 has also been changed to a PMOS transistor. Also the transistor 410 has been changed from a PMOS transistor into a NMOS transistor, and the transistor 411 has been changed from a NMOS transistor into a PMOS transistor.

Circuit 402 (circuit 403) comprises the transistors 430-433 (450-453), having inlets and outlets 434-445 (454-465), which correspond to transistors 410-413 and the inlets and outlets 414-419 of the circuit 401. A bias transistor 470 has an inlet 471 for an input current, an inlet 472 for a control voltage and an outlet 473 for providing an output current of the bias transistor 470. An output transistor 480, in turn, has an inlet 481 for an input current, an inlet 482 for a control voltage and an outlet 483 for providing an output current of the system. The output current of the output transistor 480 may be conducted e.g., to another processor in a parallel processor network or to a memory unit.

As in the preferred embodiment of the present invention (as described with reference to FIG. 3), the alternative embodiment of the present invention is also capable to evaluate the current with a specific ranked order number from the set of the output currents of the transistors 410, 430 and 450. The same may be applied to the processors that have e.g., nine circuits, with similar evaluation procedure as applied to the alternative embodiment of the present invention.

There also may be one or more transistors similar to the first transistor added in every circuit, wherein an output current of the added transistor(s) is (are) summed up with the output current of the first transistor to form a sum output current of these transistors, which will be evaluated in a same way as the output current of the first transistor in the following simplified presentation of the process applied in the present invention. The added transistor(s) is (are) similar to the first transistor, i.e., in case the first transistor is a PMOS transistor the added transistor(s) is (are) also a PMOS transistor(s). If the first transistor type is a NMOS transistor, the added transistor(s) is (are) also a NMOS transistor(s)

In this exemplifying presentation, the transistors 480, 411, 431 and 451 are of the same size, and because they have the same control voltage (Vcont) and the same supply voltages, it can be understood that output currents of transistors 480, 411, 431 and 451 are of the same value.

As for exemplifying purposes, the output current of the transistor 410 is greater than the output current of the transistor 430, which in turn is greater than the output current of the transistor 450. The transistors 411, 431 and 451 provide equal output currents in an unrestricted case. Further, the control voltages of the transistors 412, 432 and 452 are assumed here to have the same value, and the sizes of the transistors 412, 432 and 452 are the same. The unrestricted output current of transistors 412, 432 and 452 is called a reference current (Iref).

In this exemplary presentation, we will define the biggest value of the output currents of the transistors 410, 430 and 450. The output current value of the bias transistor 470 will be set to equal half of the reference current (0.5*Iref). In a stable equilibrium, the output current of the transistor 492 of the current mirror 490 equals to the output current of the bias transistor 470, i.e., the input current (sum current of the output currents of the transistors 413, 433 and 453) of the current mirror equals to the output current of the bias transistor 470. The control voltage (Vcont) has been set to a value, in which the output current of the transistor 411 equals to the output current of the transistor 410, and therefore, the transistor 413 conducts partly the output current of the transistor 412.

Because the value of the output current of the transistor 431 is greater than the value of the output current of the transistor 430, the potential value of the control voltage of the transistor 433 will get so high that the transistor 433 does not conduct the output current of the transistor 432, i.e., the value of the output current of the transistor 433 equals to 0. In this situation, the same may be applied to circuit 403, i.e., the value of the output current of the transistor 453 will equal to 0. Because the control voltage of the output transistor 480 is also Vcont, the value of the output current of the output transistor 480 will equal to the values of the output currents of the transistors 410 and 411 (which are equal), i.e., the output current of the output transistor 480 equals to the biggest value of the output currents of the transistors.

The other two output currents of the transistors 410, 430 and 450 can be extracted by setting the output current value of the bias transistor 470 to equal 1.5*Iref (when evaluating the second biggest value of the transistors 410, 430 and 450), setting the output current value of the bias transistor 470 to equal 2.5*Iref (when evaluating the third biggest value of the transistors 410, 430 and 450.) The formula to find out, which transistor has e.g., the sixth biggest output current value presented with reference to FIG. 3 also applies to the alternative embodiment of the present invention described with reference to FIG. 4.

In an alternative embodiment of the present invention, the coefficient coupling, shown in FIG. 4, is replaced with a different kind of coupling. In this embodiment of the present invention the coupling comprises only one transistor.

In this alternative embodiment of the present invention, the transistors 412, 432 and 452 are deleted from the circuits 401, 402 and 403. Each one of the transistors 413, 433 and 453 receives a source voltage and provides an output current to further processing according to the switching function of the transistors 413, 433 and 453. The source voltage is preferably set low enough in order to keep the unity current (i.e., Iref) practically low.

Except for the simplified structure of the coupling (and elimination of the coefficient structure of the coupling) that provides switching function of the circuit, the process of the structure remains essentially similar to the preferred embodiment of the present invention that is described with respect to FIG. 4.

When implementing an analog parallel processor network according to the present invention, the analog parallel processor network comprises a plurality of processors. The analog parallel processor network further comprises a plurality of memory units. The output current of the output transistor 480 is provided to a memory unit in an analog parallel processor network, where from the memory unit provides a voltage to the inlet 417 (437 and 457 respectively) of the transistors 410 (430 and 450 respectively) of another processor.

Figure 5:
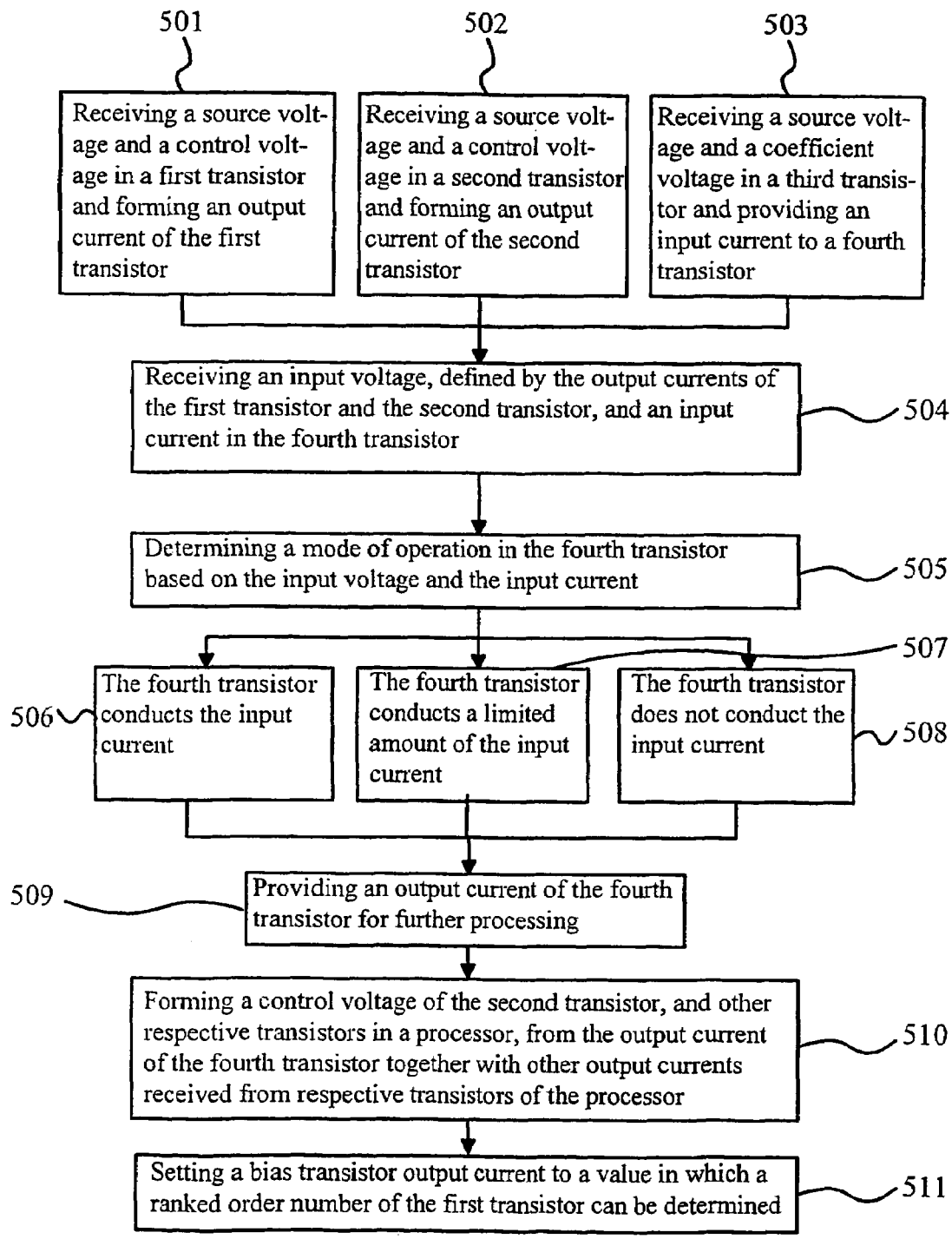
FIG. 5 is a flowchart illustrating the method of the preferred embodiment of the present invention.

Referring now to FIG. 5, which is a flowchart illustrating the method of the preferred embodiment of the present invention. In FIG. 5 on step 501, a first transistor receives a source voltage and a control voltage of the system, and forms an output current of the first transistor. Essentially at the same time, a second transistor receives a source voltage and a control voltage of the system, and provides an output current of the second transistor (step 502). The first transistor tends to feed an output current through the second transistor. Depending on the relative values of the unrestricted output currents of the first transistor and the second transistor, the result output voltage is in close approximate whether to the source voltage received in the first transistor or to the source voltage received in the second transistor. Essentially at the same time with the steps 501 and 502, a third transistor receives a source voltage and a coefficient voltage and provides an input current to a fourth transistor (step 503). The coefficient voltage received in the third transistor can be programmable. On step 504, the fourth transistor receives an input voltage (which is a control voltage of the fourth transistor) defined by the output currents of the first transistor and the second transistor, and an input current received from the third transistor in the fourth transistor.

On step 505, the fourth transistor determines a mode of operation based on the input voltage received from the first transistor and the second transistor, and the input current received from the third transistor. In case the output current value of the first transistor is greater than the output current value of the second transistor, the fourth transistor conducts the whole input current received from the third transistor without restricting the amount of the current provided by the third transistor (step 506). In this case the input current received from the third transistor defines the output current of the fourth transistor. In case the output current of the second transistor is essentially equal to the output current of the first transistor, the fourth transistor conducts a limited amount of the input current received from the third transistor in the fourth transistor (step 507). In this case, the output current of the fourth transistor is between the input current value of the fourth transistor and 0. Preferably, the value of the output current of the fourth transistor equals to an output current value of a bias transistor of the system, if a maximum current is extracted. Otherwise, the value of the output current of the fourth transistor should essentially equal to a value that is the output current of the bias transistor minus (N−1)*Iref, wherein N equals to the ranked order number that is extracted. If the output current value provided by the second transistor is greater than the output current value provided by the first transistor, the potential value of the control voltage of the fourth transistor will get such that the fourth transistor does not conduct the input current received from the third transistor in the fourth transistor (step 508), i.e., the output current of the fourth transistor is essentially equal to 0.

On step 509, the output current of the fourth transistor is provided for further processing in the system. On step 510, a control voltage of the second transistor, and other respective transistors in a processor, is formed from the output current of the fourth transistor together with other output currents received from respective transistors of the processor. The sum current of the output current of the fourth transistor and other output currents received from respective transistors and a bias transistor of the processor forms a control voltage (Vcont), which is conducted to the second transistor and respective transistors in the processor. The control voltage (Vcont) is also conducted to a bias transistor. The bias transistor output current is set to a value in which a current with a specific ranked order number from the set of the output currents of the first transistors can be determined (step 511). The bias current, i.e., the output current of the bias transistor, controls an equilibrium conditions in such a way that the sum of the output currents of the fourth transistor and its respective transistors in the processor equals to the output current of the bias transistor. This can be implemented because the control voltage of the bias transistor can be programmed to a certain value.

When evaluating a ranked order of the output currents of the first transistor and the respective transistors in a processor, the method described with reference to FIGS. 3 and 4 can be applied.

Even though the method of the present invention has been presented with steps in a specific order in this presentation, a skilled person in the art appreciates that almost every step occurs essentially at the same time in a circuit. Furthermore, only the steps 501, 503 and 511 remains constant during the processing, and the other steps, i.e., steps 502, 504-510, takes place all the time until the equilibrium of the system has been achieved.

In an alternative method of the present invention, the step 503 is eliminated, and the 'fourth transistor' (which is a third transistor in the alternative embodiment of the present invention) receives a source voltage directly (in the preferred embodiment of the present invention the third transistor received the source voltage and provided an input current of the fourth transistor to the fourth transistor). The alternative embodiment of the present invention corresponds to the preferred embodiment of the invention in other steps than the step 503.

It will be appreciated by the skilled person that various modifications may be made to the above-described embodiments without departing from the scope of the present invention, as disclosed in the appended claims. For example the number of circuits, in a processor in an analog parallel processor network, that will be evaluated is usually greater than 3. Even though the number of circuits, and therefore, also the number of the output currents of the first transistor and the respective transistors in a processor differ, the same evaluation procedure as disclosed in this presentation still applies to the system.

The invention claimed is:

1. A processor in an analog parallel processor network, for image processing, the processor comprising:
    a plurality of circuits, wherein a circuit comprises a first transistor and a second transistor, which receive respective supply voltages and operate as current sources, providing an output voltage, and a coefficient coupling, which receives the output voltage provided by the first transistor and the second transistor, providing a switching function for a circuit output current;
    a bias transistor functionally coupled to the plurality of circuits; and
    an output transistor functionally coupled to the plurality of circuits.

2. A processor according to claim 1, wherein the bias transistor provides an output current that is set to a value in which a current with a specific ranked order number from the set of output currents of the first transistor, or respective transistors, can be determined.

3. A processor according to claim 1, wherein the output transistor provides an output current from the processor.

4. A processor according to claim 1, wherein the coefficient coupling comprises:
    a third transistor, which operates as a current source; and
    a fourth transistor, which provides a switching function.

5. A processor according to claim 4, wherein the coefficient coupling provides three modes of operation:
    the fourth transistor conducts the current;
    the fourth transistor conducts a limited amount of the current; or
    the fourth transistor does not conduct the current.

6. A processor according to claim 4, wherein the third transistor receives a coefficient voltage that is programmable.

7. A processor according to claim 1, wherein the output voltage provided by the first transistor and the second transistor is the control voltage of the fourth transistor.

8. A processor according to claim 1, wherein the first transistor has an inlet for the supply voltage and an inlet for a control voltage.

9. A processor according to claim 1, wherein the second transistor has an inlet for the supply voltage and an inlet for a control voltage, wherein the control voltage is formed from an output current of the fourth transistor together with other output currents received from respective transistors of a processor and from the bias transistor.

10. A processor according to claim 1, wherein at least one of the transistors is a PMOS transistor.

11. A processor according to claim 1, wherein at least one of the transistors is a NMOS transistor.

12. A processor according to claim 1, wherein the processor further comprises at least one transistor for providing an output current that is summed up with the first transistor.

13. A method for processing images in an analog parallel processor network, the method comprising:
    receiving a source voltage and a control voltage in a first transistor, and forming an output current of the first transistor;
    receiving a source voltage and a control voltage in a second transistor, and forming an output current of the second transistor;
    receiving a source voltage and a coefficient voltage in a third transistor, and providing an input current to a fourth transistor;
    receiving an input voltage, which is defined with respect to the output currents of the first transistor and the second transistor, and an input current from the third transistor in the fourth transistor;
    determining a mode of operation in the fourth transistor based on the input voltage and the input current; and
    providing an output current of the fourth transistor for further processing.

14. A method according to claim 13, wherein the coefficient voltage is programmable.

15. A method according to claim 13, wherein the mode of operation is one of the following:
    the fourth transistor conducts the input current;
    the fourth transistor conducts a limited amount of the input current; or
    the fourth transistor does not conduct the input current.

16. A method according to claim 13, wherein the output current of the fourth transistor is provided to form a control voltage of the second transistor, and other respective transistors in a processor, together with other output currents received from respective transistors and from a bias transistor of the processor in an analog parallel processor network.

17. A method according to claim 13, wherein the method further comprises a bias transistor providing an output current that is set to a value in which a current with a specific ranked order number from the set of output currents of the first transistor, or respective transistors, can be determined.

18. A processor for processing images in an analog parallel processor network, the processor comprising:
    a plurality of circuits, wherein a circuit comprises a first transistor and a second transistor, which receive respective supply voltages and operate as current sources, providing an output voltage and a third transistor, which receives a source voltage and the output voltage provided by the first transistor and the second transistor, providing a switching function for a circuit output current;
    a bias transistor, which set an output current that is set to a value in which a current with a specific ranked order number from the set of the first transistor, or respective transistors, can be determined, and that is functionally coupled to the plurality of circuits; and an output transistor for providing an output current of the processor to following process and that is functionally coupled to the plurality of circuits.

19. A method for processing images in an analog parallel processor network, the method comprising:

receiving a source voltage and a control voltage in a first transistor, and forming an output current of the first transistor;

receiving a source voltage and a control voltage in a second transistor, and forming an output current of the second transistor;

receiving an input voltage, which is defined with respect to the output currents of the first transistor and the second transistor, and a source voltage in a third transistor;

determining a mode of operation in the third transistor based on the source voltage and the input voltage;

providing an output current of the third transistor for further processing; forming a control voltage of the second transistor from the output currents of at least one third transistor and a bias transistor of a processor, wherein the output current of the bias transistor is set to a value in which a current with a specific ranked order number from a set of output currents of the first transistors can be determined; and conducting the control voltage to at least one second transistor in the processor.

* * * * *